United States Patent
Nagda et al.

(10) Patent No.: US 12,308,698 B2
(45) Date of Patent: May 20, 2025

(54) ROBUST FAIL-SAFE SYSTEM FOR PROLONGING THE BACKUP BATTERY LIFE IN REAL-TIME LOW POWER MCU SYSTEMS

(71) Applicant: NXP B.V., Eindhoven (NL)

(72) Inventors: Miten H. Nagda, Bee Cave, TX (US); Edevaldo Pereira da Silva, Jr., Austin, TX (US); Simon Gallimore, Austin, TX (US); Nidhi Chaudhry, Austin, TX (US)

(73) Assignee: NXP B.V., Eindhoven (NL)

( * ) Notice: Subject to any disclaimer, the term of this patent is extended or adjusted under 35 U.S.C. 154(b) by 493 days.

(21) Appl. No.: 17/747,977

(22) Filed: May 18, 2022

(65) Prior Publication Data
US 2023/0378804 A1    Nov. 23, 2023

(51) Int. Cl.
*H02J 9/06* (2006.01)
*G06F 1/26* (2006.01)
*G06F 1/30* (2006.01)
*H02J 7/00* (2006.01)

(52) U.S. Cl.
CPC .............. *H02J 9/068* (2020.01); *G06F 1/263* (2013.01); *G06F 1/305* (2013.01); *H02J 7/0047* (2013.01)

(58) Field of Classification Search
CPC .. H02J 9/068; G06F 1/263; G06F 1/30; G06F 1/305
See application file for complete search history.

(56) References Cited

U.S. PATENT DOCUMENTS

| | | | |
|---|---|---|---|
| 4,451,742 A | 5/1984 | Aswell | |
| 7,493,505 B2 | 2/2009 | Leung | |
| 7,962,773 B2 | 6/2011 | Fernald et al. | |
| 10,594,158 B2 | 3/2020 | Ou Yang et al. | |
| 11,223,227 B1 * | 1/2022 | Phillips | G06F 1/263 |
| 2010/0237696 A1 | 9/2010 | Maleyran et al. | |

(Continued)

FOREIGN PATENT DOCUMENTS

WO    WO 2006102928 A1    10/2006

OTHER PUBLICATIONS

Silicon Labs, EFM32, Backup Power Domain, AN0041 Rev1.26 Application Note, May 25, 2014.

(Continued)

*Primary Examiner* — Mark A Connolly

(57) ABSTRACT

A method and system are provided for supplying power to a backup power domain by connecting a battery voltage to a supply terminal for a backup power domain in a low power microcontroller during a startup mode when a main supply voltage, by detecting application of the main supply voltage to the low power microcontroller at a predetermined safe voltage level, and by activating a selection control circuit to power the backup power domain in the low power microcontroller from the main power supply voltage or the backup power supply voltage based on a software-controlled configuration bit, where the selection control circuit is configured to connect, in response to the software-controlled configuration bit having a first user-selected value, the main power supply voltage to the supply terminal for the backup power domain when the main power supply voltage is smaller than the battery power supply voltage.

20 Claims, 8 Drawing Sheets

(56) References Cited

U.S. PATENT DOCUMENTS

| | | |
|---|---|---|
| 2013/0069707 A1 | 3/2013 | Chaudhry et al. |
| 2013/0082533 A1 | 4/2013 | Hicks |
| 2017/0126005 A1 | 5/2017 | Elsayed et al. |
| 2017/0184642 A1* | 6/2017 | Menard .............. G05B 19/0428 |
| 2018/0046211 A1 | 2/2018 | Vilas Boas et al. |
| 2022/0066493 A1 | 3/2022 | Lin et al. |

OTHER PUBLICATIONS

Ling Lin et al., Power Management in Low-Power MCUs for Energy IoT Applications, Hindawi, Journal of Sensors, vol. 2020, Article ID 8819236, 12 pages, published Dec. 14, 2020.

Warren Miller, MCU-controlled Battery Management is Critical for Successful Internet of Things Implementations, Digi-Key Electronics, Apr. 1, 2015.

NXP Semiconductors, Logic controlled high-side power switch, NX5P2925C, Product Data Sheet, Rev. 1, Jul. 7, 2015.

\* cited by examiner

ROBUST FAIL-SAFE SYSTEM FOR PROLONGING THE BACKUP BATTERY LIFE IN REAL-TIME LOW POWER MCU SYSTEMS

BACKGROUND OF THE INVENTION

Field of the Invention

The present invention is directed in general to microcontroller units. In one aspect, the present invention relates to a power control management in Low-Power microcontroller units for Internet-of-Things applications.

Description of the Related Art

Microcontroller units (MCUs) are increasingly used to implement Internet of Things (IoT)-oriented designs, but as more functions are integrated in MCUs (e.g., networking, high-efficiency sensor interfaces, etc.), there are increasing challenges with providing low-power designs, especially as multiple power domains are included in MCU designs. Additional design challenges arise with low power MCU systems, such as in Internet-of-Things (IoT) applications, that do not always have access to a main power supply and must use a standby power supply (usually the battery) to maintain the operation and save the data when the main power supply is not available. In order to achieve acceptable battery lifetime, MCU designs typically include power supply management features that continually monitors the main power supply level and then switches to provide power from a battery power supply when a predetermined power supply switching condition is detected, such as when the main power supply level degrades below a threshold voltage or below the battery power supply level. However, existing power supply management solutions for low power MCU systems suffer from a number of design drawbacks and performance deficiencies as described more fully hereinbelow.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

Figure 1:
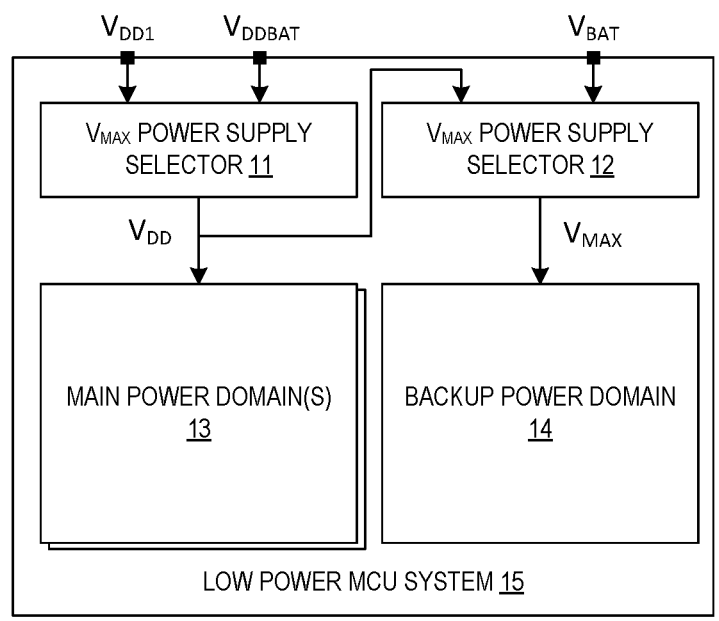
FIG. 1 is a simplified block diagram illustrating a low power MCU system power architecture that is divided into a plurality of separately powered domains.

An adaptive and efficient power supply architecture, method, system, and apparatus for a high performance, low power microcontroller are provided to allow the battery domain to be selectively powered by either the main supply or backup battery under software control using the voltage monitors that are already present in a microcontroller for normal operation, thus avoiding any additional quiescent current drainage, thereby conserving backup battery power and prolonging the life of the backup battery. By using voltage monitors that exists as part of the microcontroller system, the adaptive and efficient power supply switching technique does not require additional voltage measuring circuitry. Implemented with a power-on-reset and level shifter hardware circuitry under control of one or more configuration bits, a power multiplexer circuit selectively switches a main power supply input and battery power supply input to power a backup power domain with the main power supply when predetermined conditions are met to ensure reliable operation when power is first applied to the battery domain and to switch the battery domain back to the battery supply if the main supply is lost, thereby retaining to retain state and MCU functionality.

By way of background to the present disclosure, it will be understood that even simple MCUs typically have multiple power domains on-chip. Having multiple domains can allow more efficient management and control of power delivery to the portions of the MCU that are needed based on the functions are needed at any given time. To illustrate the power-saving advantage of having multiple power domains, reference is now made to FIG. 1 which depicts a simplified schematic block diagram of a low power MCU system power architecture 10 that is divided into a plurality of separately powered domains 13, 14. In the illustrated power architecture 10, low power MCU chip or system 15 is divided into at least two domains, including a first main power domain 13 and a second backup power domain 14. The first main power domain 13 provides power to the functional circuitry of the MCU 15, such as the digital core (processor, memory, and digital peripherals), and the second backup power domain 14 provides power to the "always on" circuits of the MCU 15, such as the crystal oscillator real time clock (RTC), backup registers or memory, or security circuits.

In operation, an input main power supply $V_{DD}$ may be applied to directly power the main power domain 13. For example, the input main power supply $V_{DD}$ may be generated by an external source and supplied to a $V_{DD}$ supply terminal on the MCU system 15 which directly powers the main power domain 13. In other embodiments, the input main power supply $V_{DD}$ may be generated on-chip by a first maximum voltage power supply selector circuit 11 which selects the larger of a main power input $V_{DD1}$ and main battery input $V_{DDBAT}$ to generate the input main power supply $V_{DD}$ to the main power domain 13. As a result, the first maximum voltage power supply selector circuit 11 powers the main power domain 13 with the main power supply input $V_{DD1}$ until there is power outage or other reduction (e.g., $V_{DD1}<V_{DDBAT}$), at which point the first maximum voltage power supply selector circuit 11 switches to power the main power domain 13 with the main battery input $V_{DDBAT}$. Though not shown, another battery-backup implementation solution is to use a low-voltage detector to automatically switch to power the main power domain 13 with the main battery input $V_{DDBAT}$ when the main power supply input $V_{DD1}$ is below a set threshold In similar fashion, an input battery power supply $V_{BAT}$ may be applied to directly or indirectly power the backup power domain 14. Typically, the input battery power supply $V_{BAT}$ is generated by a small external battery (e.g., coin cell) that is located off-chip from the MCU 15. To extend the life of such external batteries, conventional power management solutions have employed an automated power supply selection mechanism for powering the backup power domain 14 with the larger of an input main power supply $V_{DD}$ and the input battery power supply $V_{BAT}$. For example, the input main power supply $V_{DD}$ and the input battery power supply $V_{BAT}$ may be connected to a second maximum voltage power supply selector circuit 12 which selects the larger input to generate the input battery power supply $V_{MAX}$ to the backup power domain 14. As a result, the second maximum voltage power supply selector circuit 12 powers the backup power domain 14 with the input main power supply $V_{DD}$ until there is power outage or other reduction (e.g., $V_{DD}<V_{BAT}$), at which point the second maximum voltage power supply selector circuit 12 switches to power the backup power domain 14 with the input battery power supply $V_{BAT}$.

While conceptually simple, there are a number of design drawbacks and performance deficiencies associated with such conventional power management solutions. For example, the automatic power supply selector circuits require significant amounts of quiescent current to continuously monitor the battery and other available power supplies in order to provide timely power supply switching, resulting in continuous battery drain. In addition, the automated nature of the power switching operation can result in the battery supply being selected to power the backup power domain, even though the voltage level of an available power supply is suitable to power the backup power domain. For example, a power switch may be triggered when the input main power supply $V_{DD}$ is lower than the input battery power supply $V_{BAT}$, but the input main power supply $V_{DD}$ may still be able to power the backup power domain, resulting in unnecessary current drain from the battery. The automated power switching operation can also create difficulties in dealing with a significant number of corner cases, causing significant complexity while dealing problems like power sequencing or latch-up concerns. Yet another drawback with automated power switching is that the user/system has no flexibility to select or override the source of the power to the backup power domain. For example, in one application with a rechargeable backup battery, the user may opt for simple system and not enable the battery saving feature.

Figure 2:
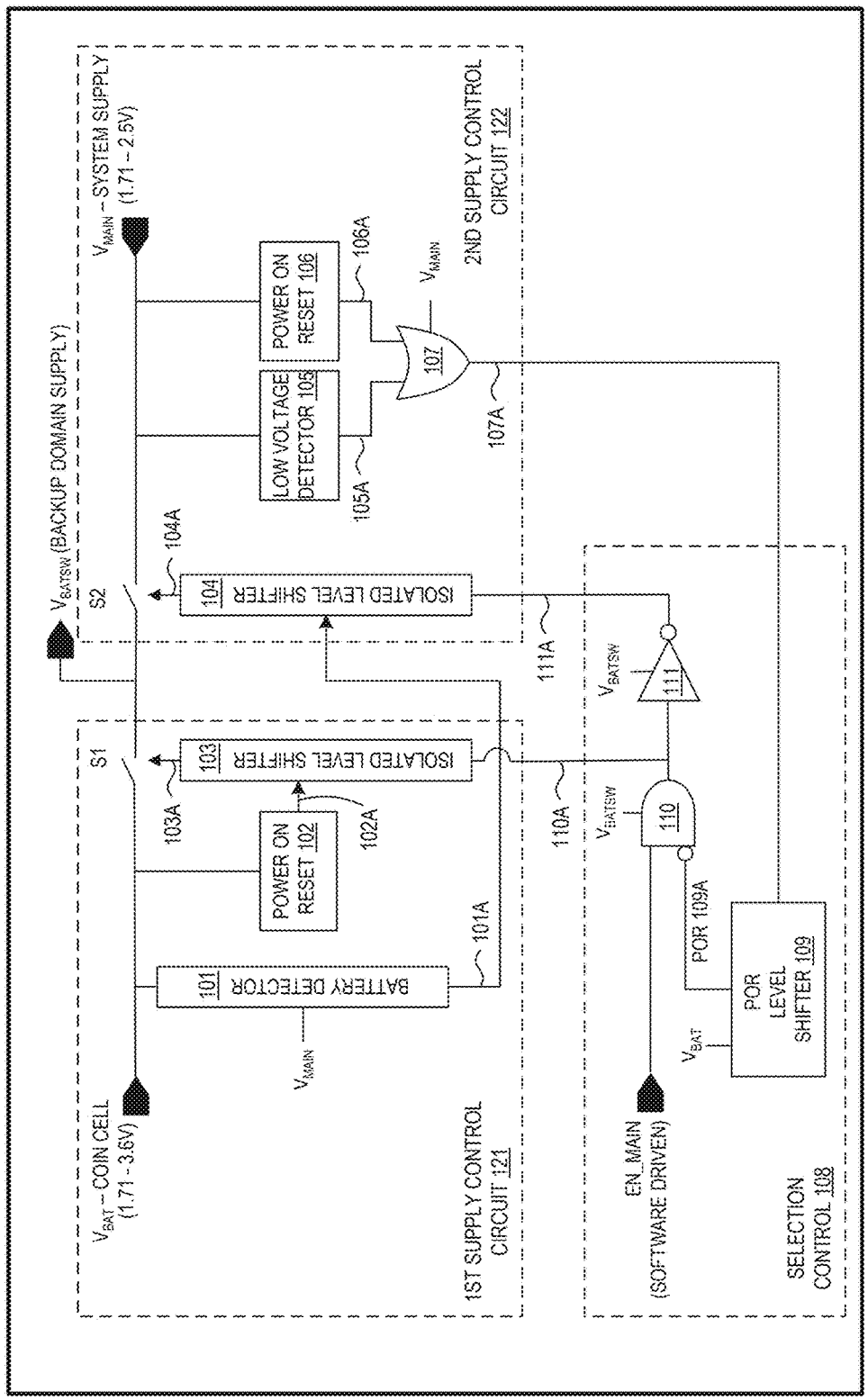
FIG. 2 is a simplified schematic circuit diagram illustrating an adaptive, software-controlled power supply multiplexer for a low power MCU system in accordance with selected embodiments of the disclosure.

To address these deficiencies from conventional approaches and others known to those skilled in the art, there is disclosed herein a software-controlled power supply multiplexer method and apparatus which allows the battery domain logic to be powered by either the backup battery or the MCU main supply without requiring additional supply voltage monitoring or associated quiescent current drainage, thereby conserving backup battery power and prolonging the life of the backup battery. As disclosed, the power supply multiplexer includes a first power-on-reset (POR) circuit which is connected between the backup battery and a first level shifter to generate a reset signal that closes a first battery supply switch when the backup battery is supplied, thereby ensuring that the power supply multiplexer switches to power the backup domain logic with the backup battery at power-up. The power supply multiplexer also includes a battery detector circuit which is connected between the backup battery and a second level shifter to generate a cut-off signal when the backup battery is being changed that opens a second main supply switch, thereby preventing reverse current from the main supply to the battery domain logic or the battery itself. In addition, the power supply multiplexer includes a second POR circuit and a low voltage detector circuit which are connected to the main supply to generate a reset signal when the main power is not with a predetermined valid voltage range, thereby ensuring that the power supply multiplexer does not power the backup domain logic with the main supply if the main supply is missing or is not in the valid range. Under control of one or more software-configured control bits, the power supply multiplexer also includes a POR level shifter circuit which is connected to monitor the backup battery and main supply to allow software control of the power supply selection when both the backup battery and main supply are valid, to power the battery domain logic with the backup battery when the backup battery is connected, and to prevent switching to power the battery domain logic with the main supply if the main supply is not at a valid supply level. In this way, the power supply multiplexer is controlled by software-configured control bits to monitor the first and second POR circuits, low voltage detector circuit, and battery detector circuit to allow switching of the backup battery or the MCU main supply to power the battery domain logic when certain conditions are met To provide additional details for an improved understanding of selected embodiments of the present disclosure, reference is now made to FIG. 2 which is a simplified schematic circuit diagram illustrating an adaptive, software-controlled power supply multiplexer 20 for a low power MCU system. As depicted, the power supply multiplexer 20 includes a first supply control circuit 121 and a second supply control circuit 122 which are connected to receive, respectively, an input battery supply voltage at the input terminal $V_{BAT}$ and an input main supply voltage at the input terminal $V_{MAIN}$, and to generate therefrom a software-controlled output battery supply voltage at the output terminal $V_{BATSW}$ which is used to power the backup domain. The depicted power supply multiplexer 20 also includes a selection control circuit 108 that is connected to allow software control of the power supply switching when both the backup battery and main supply are valid by monitoring the backup battery and main supply while consuming zero additional power from the battery. Based on the detected status of the backup battery and main supply, the selection control circuit 108 is connected and configured to provide level shifter input signals to the first and second supply control circuits 121, 122 when the backup battery and main supply are valid, and to prevent power supply switching to connect the battery domain logic with the main supply if the main supply is not at a valid supply level.

In the first supply control circuit 121, the battery supply terminal $V_{BAT}$ is connected to an external battery source, such as a coin cell battery, and includes a first power switch S1 that connects the battery supply terminal $V_{BAT}$ to the output terminal $V_{BATSW}$ under control of a gating control signal 103A generated by the first isolated level shifter circuit 103. In similar fashion, the second supply control circuit 122 includes a second power switch S2 connected between the main power supply terminal $V_{MAIN}$ and the output terminal $V_{BATSW}$ under control of a gating control signal 104A generated by the second isolated level shifter circuit 104. In selected embodiments, the first and second power switches S1, S2 may each be implemented with one or more PMOS switches, with the first PMOS power switch S1 connect the battery supply terminal $V_{BAT}$ to the output terminal $V_{BATSW}$ under control of the gating control signal 103A, and with the second PMOS power switch S2 connect the main power supply terminal $V_{MAIN}$ to the output terminal $V_{BATSW}$ under control of the gating control signal 104A. However, it will be appreciated that the power switches S1, S2 may be implemented with one or more NMOS switches, provided that the polarity of the gating control signals 103A, 104A are adjusted accordingly.

As will be appreciated, there are a number of operational situations where the values of the battery and main supply can vary. For example, a battery typically generates voltages that change over the battery lifetime, and can have a wide range of operating voltages (e.g., 1.71-3.6V). In addition, the main supply voltage can have a wide range of operating voltages (e.g., 1.71-2.5V). As illustrated with these different ranges, the battery supply voltage (e.g., $V_{BAT}$=3.5V) may be larger than the main supply voltage (e.g., $V_{MAIN}$=1.8V), and yet the main supply voltage is still operating at a level that is sufficient to power the backup domain logic. In such cases, if the battery is selected to power the backup domain logic using a rigid "maximum voltage selection" switching decision, this results in unnecessary current drain from the battery. However, the ability for the power supply multiplexer 20 to adaptively switch between the battery and main supplies when powering the backup domain logic may also take into account the corner cases that arise when either the battery or main supply are removed or disrupted from the MCU system. For example, it will be appreciated that the battery may need to be replaced over time, in which case the battery is removed from the MCU system, in which case the battery supply terminal $V_{BAT}$ has a floating or grounded voltage, depending on the design. Likewise, there may be disruptions or loss of the main power supply that can reduce or eliminate the main supply voltage level.

To account for these operational conditions and constraints, the first supply control circuit 121 includes a first POR circuit 102 that is connected to the battery supply terminal $V_{BAT}$ to generate a reset signal 102A for controlling the first isolated level shifter circuit 103. When the POR reset signal 102A indicates that there is an invalid battery supply at the battery supply terminal $V_{BAT}$, the first isolated level shifter circuit 103 generates a gating control signal 103A when the POR reset signal 102A is asserted to safe-state the level shifter's gating control signal 103A, thereby forcing the first power switch S1 to close/conduct. As will be appreciated, the logic may be in an uninitialized or random state when the battery supply $V_{BAT}$ is first applied, so the first power-on-reset circuit 102 is configured to respond to the battery supply $V_{BAT}$ being applied by asserting a POR reset signal 102A to reset the logic, and after some conditions are met or a predetermined time interval passes, the first power-on-reset circuit 102 negates or deasserts the POR reset signal 102A. In similar fashion, the first power-on-reset circuit 102 also asserts the POR reset signal 102A when the battery supply $V_{BAT}$ drops into an invalid range. However, when the POR reset signal 102A indicates that there is a valid battery supply at the battery supply terminal $V_{BAT}$, the first isolated level shifter circuit 103 generates a gating control signal 103A from the level shift input signal 110A that allows the first power switch S1 to be controlled by software/hardware logic at the selection control circuit 108.

As described hereinabove, the first POR circuit 102 is used to close the first power switch S1 when the POR reset signal 102A indicates that there is an invalid battery supply at the battery supply terminal $V_{BAT}$. The reason for this approach is that selected embodiments of the disclosed power supply multiplexer are designed to treat the battery supply $V_{BAT}$ as an "always present" supply so that either nothing is powered or at least the battery supply $V_{BAT}$ has to be powered. As a result, the main power supply $V_{MAIN}$ cannot be applied without the battery supply $V_{BAT}$ being applied, meaning that the system cannot function without the battery supply $V_{BAT}$. Operationally, this means that the first thing that ever happens to a part is that the battery supply $V_{BAT}$ is powered, at which point the main power supply $V_{MAIN}$ may be missing. Thus, when the battery supply $V_{BAT}$ is applied, the logic of the power supply multiplexer is powered by the battery supply $V_{BAT}$. In embodiments where the system cannot operate without the battery supply $V_{BAT}$, if all supplies are powered and the battery supply $V_{BAT}$ drops into invalid range, the output terminal $V_{BATSW}$ should not be valid, so the first POR circuit 102 connects the output terminal $V_{BATSW}$ to the battery supply terminal $V_{BAT}$ which allows the backup domain logic to be unpowered. When the battery supply terminal $V_{BAT}$ comes back, the first POR circuit 102 will reset the logic. And when the battery supply terminal $V_{BAT}$ is missing and the main power supply $V_{MAIN}$ is alive, the second power switch S2 is opened to prevent leakage from the main power supply $V_{MAIN}$. However, in other embodiments where the system can operate without the battery supply $V_{BAT}$, if all supplies are powered and the battery supply $V_{BAT}$ drops into invalid range, the output terminal $V_{BATSW}$ may be switched to be connected to the main power supply terminal $V_{MAIN}$ which allows the backup domain logic to be powered.

In another operational scenario, the battery supply voltage $V_{BAT}$ is applied first, in which case the first POR circuit 102 asserts the reset signal 102A to cause the output terminal $V_{BATSW}$ to power up to the battery supply voltage $V_{BAT}$.

In addition, the first supply control circuit 121 includes a battery detector circuit 101 that is connected to the battery supply terminal $V_{BAT}$ and powered by the main power supply $V_{MAIN}$ to generate a battery detection signal 101A for controlling the second isolated level shifter circuit 104. Since it is powered by the main power supply $V_{MAIN}$, the battery detector circuit 101 does not consume any power from the battery. When the battery detection signal 101A indicates that the battery supply is removed (e.g., when the battery is being changed), the second isolated level shifter circuit 104 responds to the battery detection signal 101A by generating a gating control signal 104A from the level shift input signal 111A which provides a battery missing switching signal to open the second power switch S2 to prevent back current from the main power supply $V_{MAIN}$ to the at the output terminal $V_{BATSW}$ and/or to the battery itself. However, when the battery detection signal 101A indicates that the battery is present, the second isolated level shifter circuit 104 generates a gating control signal 104A from the level shift input signal 111A that allows the second power switch S2 to be controlled by software/hardware logic at the selection control circuit 108.

As will be appreciated, external capacitors (not shown) are connected on each power supply, including the battery. While the battery is being changed, its external capacitor will continue to supply some charge to the system. If the current consumption is small, the external capacitor may hold the voltage until the battery is reinserted, and the system will not react to the battery being changed. However, if the external capacitor is unable to supply the load, then the output voltage will drop and battery detector 101 will activate to generate the battery detection signal 101A which causes the second isolated level shifter circuit 104 to open the second power switch S2.

To ensure that the output terminal $V_{BATSW}$ is not connected to the main power supply $V_{MAIN}$ when the main supply is missing or otherwise at a unsafe level, the second supply control circuit 122 includes a low voltage detector circuit 105 that is connected to the main supply terminal $V_{MAIN}$ to generate a "low voltage" detection signal 105A that has a first logic value (e.g., logic "1") to indicate if the main supply is below a minimum voltage threshold and a second logic value (e.g., logic "0") to indicate if the main supply is at or above the minimum voltage threshold. In addition, the second supply control circuit 122 includes a second POR circuit 106 that is connected to the main supply terminal $V_{MAIN}$ to generate a reset signal 106A wherein a pulse has a first logic value (e.g., logic "1") when the main supply voltage is not valid. Together, the "low voltage" detection signal 105A and reset signal 106A are connected to an OR gate 107 that is powered by the main power supply $V_{MAIN}$ to generate a supply detection signal 107A which has a first logic value (e.g., logic "0") to indicate that the main power supply is at a safe level and which has a second logic value (e.g., logic "1") to indicate that the main power supply is not at a safe level.

To control the first and second supply control circuits 121, 122, the selection control circuit 108 is connected to receive the supply detection signal 107A and to generate level shift input signals 110A, 111A. In particular, the selection control circuit 108 includes a POR level shifter circuit 109 that monitors the battery and main power supplies to generate a POR signal 109A in response to the supply detection signal 107A. To monitor the battery power supply, the POR level shifter circuit 109 is powered by the battery power supply $V_{BAT}$, but does not consume any active power from either supplies. And to monitor the main power supply, the POR level shifter 109 is connected to receive the supply detection signal 107A as an input, and to generate the POR signal 109A with a first de-asserted logic value (e.g., logic "0") when the battery and main power supplies are valid, and to generate the POR signal 109A with a second asserted logic value (e.g., logic "1") when the battery supply is applied or when the main power supply is invalid (as indicated by the supply detection signal 107A having the second logic value). Again, the POR level shifter 109 generates the POR signal 109A to account for the fact that the logic may be in an uninitialized or random state, so the POR level shifter 109 is configured to assert the POR reset signal 109A to reset the logic, and after some conditions are met or a predetermined time interval passes, the POR level shifter 109 negates or deasserts the POR reset signal 109A.

The selection control circuit 108 also includes an AND gate circuit 110 and inverter gate circuit 111 connected in series to generate the level shift input signals 110A, 111A in response to the POR signal 109A and a software controlled main power supply enable selection signal EN_MAIN. Powered by the output battery supply voltage $V_{BATSW}$, the AND gate circuit 110 includes a first inverted input (connected to receive the POR signal 109A) and a second non-inverted input (connected to receive the software controlled main power supply enable selection signal EN_MAIN), and generates the first level shift input signal 110A as the logical AND combination of the inputs. In addition, the inverter gate circuit 111 is powered by the output battery supply voltage $V_{BATSW}$ and connected to receive the first level shift input signal 110A as an input, and to generate the second level shift input signal 111A as an inverted version of the input 110A.

When the battery supply voltage $V_{BAT}$ is applied, the POR level shifter circuit 109 asserts the output POR signal 109A which causes the AND gate circuit 110 to generate a first level shift input signal 110A which has a first logic value (e.g., logic "0") and the inverter gate circuit 111 generates a second level shift input signal 111A which has a second logic value (e.g., logic "1"). In response, the first isolated level shifter 103 outputs the gating control signal 103A to close the first power switch S1 (thereby connecting the battery supply terminal $V_{BAT}$ to the output battery supply voltage terminal $V_{BATSW}$) and the second isolated level shifter 104 outputs the gating control signal 104A to open the second power switch S2 (thereby disconnecting the main supply terminal $V_{MAIN}$ from the output battery supply voltage terminal $V_{BATSW}$). Likewise, when the main power supply voltage $V_{MAIN}$ is invalid (as indicated by the supply detection signal 107A), the POR level shifter circuit 109 asserts the output POR signal 109A which causes the first isolated level shifter 103 to close the first power switch S1 and connect the battery supply terminal $V_{BAT}$ to the output battery supply voltage terminal $V_{BATSW}$, and also causes the second isolated level shifter 104 to open the second power switch S2 and disconnect the main supply terminal $V_{MAIN}$ from the output battery supply voltage terminal $V_{BATSW}$.

When both the battery and main power supplies are valid and the main power supply enable selection signal EN_MAIN has a first logic value (e.g., logic "0") to indicate that the main power supply is not to be used to power the backup domain, the AND gate circuit 110 generates a first level shift input signal 110A which has a first logic value (e.g., logic "0") and the inverter gate circuit 111 generates a second level shift input signal 111A which has a second logic value (e.g., logic "1"). In response, the first isolated level shifter 103 outputs the gating control signal 103A to close the first power switch S1 (thereby connecting the battery supply terminal $V_{BAT}$ to the output battery supply voltage terminal $V_{BATSW}$) and the second isolated level shifter 104 outputs the gating control signal 104A to open the second power switch S2 (thereby disconnecting the main supply terminal $V_{MAIN}$ from the output battery supply voltage terminal $V_{BATSW}$). However, when the battery and main power supplies are valid and the main power supply enable selection signal EN_MAIN has a second logic value (e.g., logic "1") to indicate that the main power supply is to be used to power the backup domain, the AND gate circuit 110 generates the first level shift input signal 110A to have a second logic value (e.g., logic "1") and the inverter gate circuit 111 generates the second level shift input signal 111A to have a first logic value (e.g., logic "0"). In response, the first isolated level shifter 103 outputs the gating control signal 103A to open the first power switch S1 (thereby disconnecting the battery supply terminal $V_{BAT}$ from the output battery supply voltage terminal $V_{BATSW}$) and the second isolated level shifter 104 outputs the gating control signal 104A to close the second power switch S2 (thereby connecting the main supply terminal $V_{MAIN}$ to the output battery supply voltage terminal $V_{BATSW}$).

Figure 3:
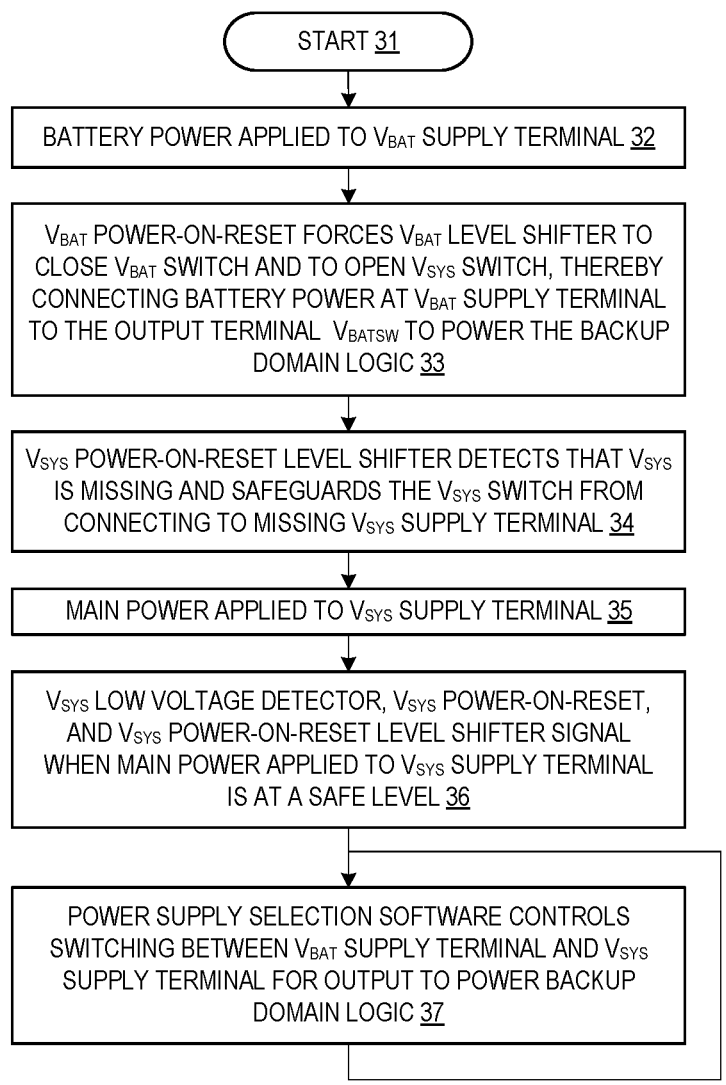
FIG. 3 illustrates a simplified flow chart showing the control logic for the operation of an adaptive, software-controlled power supply multiplexer when a battery power supply is applied before the main power supply in accordance with selected embodiments of the present disclosure.

With the disclosed power supply multiplexer, the battery and main power supplies are monitored under software control by using $V_{BAT}$ and $V_{SYS}$ power-on-reset circuits, a $V_{SYS}$ low voltage detector, a $V_{BAT}$ battery presence detector, and a $V_{SYS}$ power-on-reset level shifter circuit to allow switching of the power supplies to the backup power domain when certain conditions are met and to protect the backup power domain against state loss when either the main power supply or battery power supply is removed. To address a first power supply sequencing scenario, reference is now made to FIG. 3 which illustrates a simplified flow chart 30 showing the control logic and methodology for operating an adaptive, software-controlled power supply multiplexer when a battery power supply $V_{BAT}$ is applied before the main power supply $V_{SYS}$ in accordance with selected embodiments of the present disclosure. After the method starts (step 31), the battery power is applied to the $V_{BAT}$ battery power terminal (step 32) before the main power supply $V_{SYS}$ is ready. In response, the $V_{BAT}$ POR circuit (e.g., POR 102) forces the $V_{BAT}$ level shifter circuit (e.g., LS 103) to close the $V_{BAT}$ switch (e.g., S1) and to open the $V_{SYS}$ switch (e.g., S2), thereby connecting the battery power at the $V_{BAT}$ battery power terminal to the output terminal $V_{BATSW}$ to power the backup domain logic (step 33). Once there is power supplied to the output terminal $V_{BATSW}$, the logic gates 110 and 111 are powered and the selection control circuit 108 is fully powered to enable the $V_{SYS}$ power-on-reset level shifter (e.g., POR LS 109) to detect the missing main power supply $V_{SYS}$ and to safeguard the $V_{SYS}$ switch (e.g., S2) from connecting the (missing) main power supply $V_{SYS}$ to the output terminal $V_{BATSW}$ (step 34), such as by forcing the $V_{SYS}$ level shifter circuit (e.g., LS 104) to open the $V_{SYS}$ switch (e.g., S2). At this point, the power supply multiplexer is operatively coupled to power the backup domain logic with the battery power supply $V_{BAT}$ since the main power supply $V_{SYS}$ is not ready. At step 35, the main power supply $V_{SYS}$ is applied to the $V_{SYS}$ supply terminal, and with the selection control circuit is fully powered, the power supply multiplexer can detect when the main power supply $V_{SYS}$ is at a safe level. To this end, the low voltage detector (e.g., LVD 105), $V_{SYS}$ POR (e.g., POR 106), and $V_{SYS}$ POR level shifter (e.g., PORLS 109) generate a signal when the main power applied to the $V_{SYS}$ supply terminal is at a safe level (step 36). At this point, both the main power supply $V_{SYS}$ and the battery power supply $V_{BAT}$ are available to power the backup logic domain, and the power supply selection software can then control the switching between the battery power supply (at the $V_{BAT}$ supply terminal) and main power supply (at the $V_{SYS}$ supply terminal) for output to power the backup domain logic (step 37). For example, the power supply selection software may respond to a user configuration bit being set to a first value (e.g., 1) to connect the main power supply (at the $V_{SYS}$ supply terminal) for output to power the backup domain logic. And if the user configuration bit is set to a second value (e.g., 0), then the power supply selection software may connect the battery power supply (at the $V_{BAT}$ supply terminal) for output to power the backup domain logic.

Figure 4:
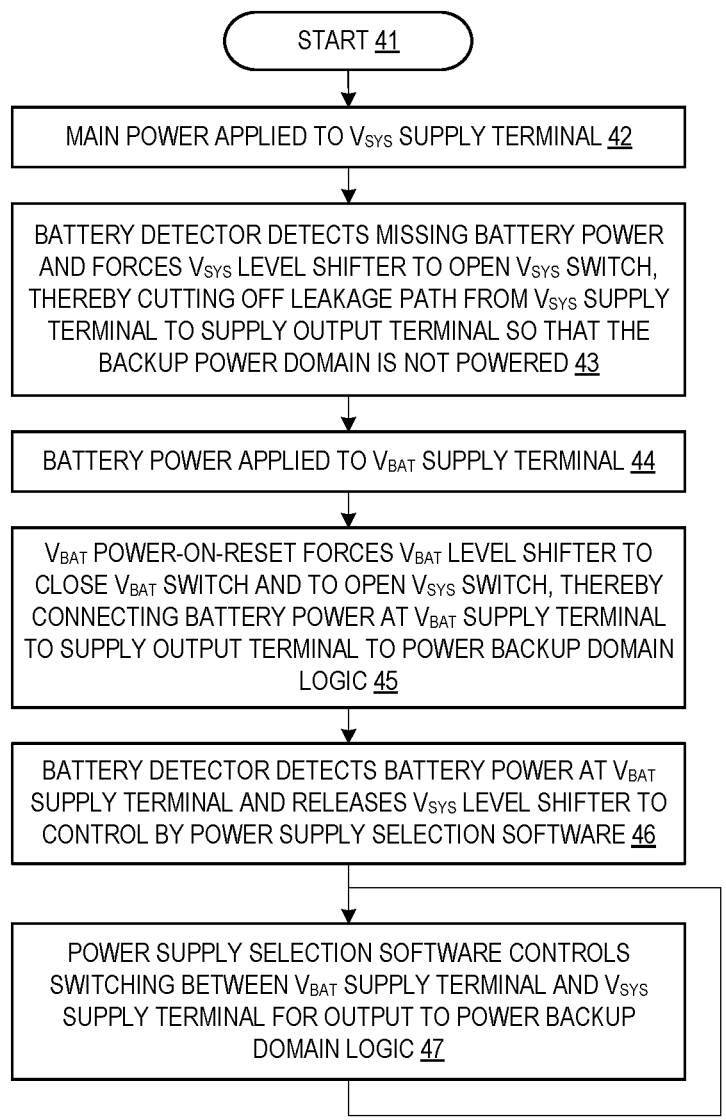
FIG. 4 illustrates a simplified flow chart showing the control logic for the operation of an adaptive, software-controlled power supply multiplexer when a main power supply is applied before the battery power supply in accordance with selected embodiments of the present disclosure.

To address a second power supply sequencing scenario, reference is now made to FIG. 4 which illustrates a simplified flow chart 40 showing the control logic and methodology for operating an adaptive, software-controlled power supply multiplexer when a main power supply $V_{SYS}$ is applied before the battery power supply $V_{BAT}$ in accordance with selected embodiments of the present disclosure. When the method starts (step 41), the main power is applied to the $V_{SYS}$ battery power terminal (step 42) before the battery power supply $V_{BAT}$ is ready. In response, the battery detector (e.g., detector 101) detects the missing battery power and forces the $V_{SYS}$ level shifter circuit (e.g., LS 104) to open the $V_{SYS}$ switch (e.g., S2), thereby cutting off a leakage path to the output terminal $V_{BATSW}$ from the main power supply $V_{SYS}$ at the $V_{SYS}$ supply terminal (step 43). At this point, the power supply multiplexer is operatively coupled so that the backup domain logic is not powered by either the battery power supply $V_{BAT}$ or the main power supply $V_{SYS}$. At step 44, the battery power supply $V_{BAT}$ is applied to the $V_{BAT}$ supply terminal. In response, the $V_{BAT}$ POR circuit (e.g., POR 102) helps power up the $V_{BATSW}$ terminal when the $V_{BAT}$ level shifter circuit (e.g., LS 103) closes the $V_{BAT}$ switch (e.g., S1), thereby powering the selection control logic (e.g., logic gates 110 and 111) to open the $V_{SYS}$ switch (e.g., S2), thereby connecting the battery power at the $V_{BAT}$ battery power terminal to the output terminal $V_{BATSW}$ to power the backup domain logic (step 45). At this point, the selection control circuit is fully powered, and upon detecting the presence of the battery power at the $V_{BAT}$ supply terminal, the battery detector releases the $V_{SYS}$ level shifter circuit (e.g., LS 104) to control by the power supply selection software (step 46). At this point, both the main power supply $V_{SYS}$ and the battery power supply $V_{BAT}$ are available to power the backup logic domain, and the power supply selection software can then control the switching between the battery power supply (at the $V_{BAT}$ supply terminal) and main power supply (at the $V_{SYS}$ supply terminal) for output to power the backup domain logic (step 47). For example, the power supply selection software may respond to a user configuration bit being set to a first value (e.g., 1) to connect the main power supply (at the $V_{SYS}$ supply terminal) for output to power the backup domain logic. And if the user configuration bit is set to a second value (e.g., 0), then the power supply selection software may connect the battery power supply (at the $V_{BAT}$ supply terminal) for output to power the backup domain logic.

Figure 5:
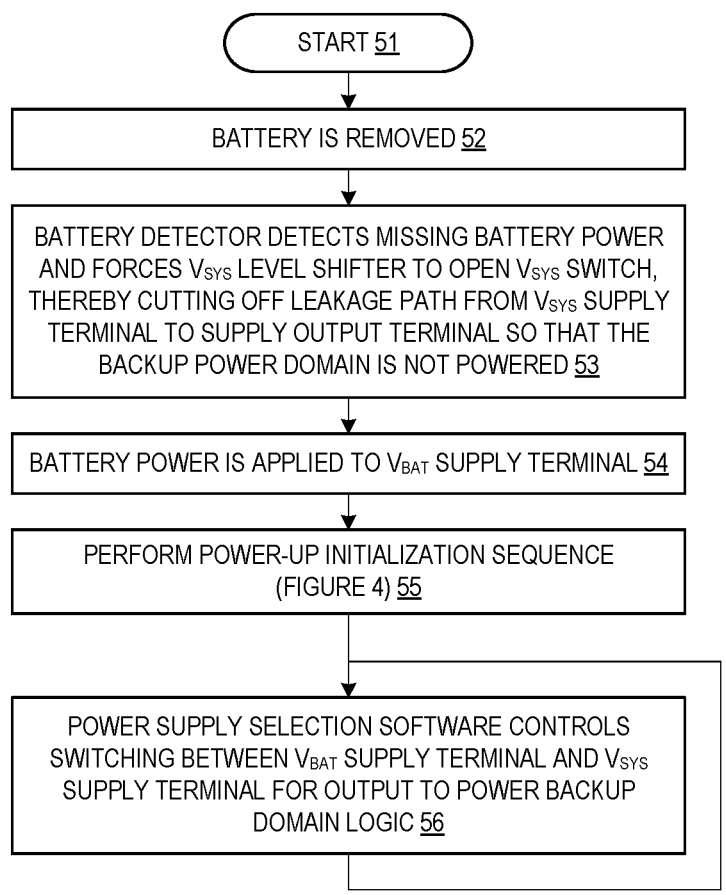
FIG. 5 illustrates a simplified flow chart showing the control logic for the operation of an adaptive, software-controlled power supply multiplexer when a battery is being changed in accordance with selected embodiments of the present disclosure.

To address a third power supply sequencing scenario, reference is now made to FIG. 5 which illustrates a simplified flow chart 50 showing the control logic and methodology for operating an adaptive, software-controlled power supply multiplexer when a battery is being changed in accordance with selected embodiments of the present disclosure. When the method starts (step 51), the main power is already applied to the $V_{SYS}$ battery power terminal before the battery is removed. After the battery is removed (step 52), the battery detector (e.g., detector 101) detects the missing battery power and forces the $V_{SYS}$ level shifter circuit (e.g., LS 104) to open the $V_{SYS}$ switch (e.g., S2), thereby cutting off a leakage path to the output terminal $V_{BATSW}$ from the main power supply $V_{SYS}$ at the $V_{SYS}$ supply terminal (step 53). At this point, the power supply multiplexer is operatively coupled so that the backup domain logic is not powered by either the battery power supply $V_{BAT}$ or the main power supply $V_{SYS}$. At step 54, the battery power supply $V_{BAT}$ is applied to the $V_{BAT}$ supply terminal. In response, the software-controlled power supply multiplexer proceeds to the power-up initialization sequence step 44 depicted in FIG. 4 (step 55). Once both the main power supply $V_{SYS}$ and the battery power supply $V_{BAT}$ are available to power the backup logic domain, the power supply selection software can then control the switching between the battery power supply (at the $V_{BAT}$ supply terminal) and main power supply (at the $V_{SYS}$ supply terminal) for output to power the backup domain logic (step 56).

Figure 6:
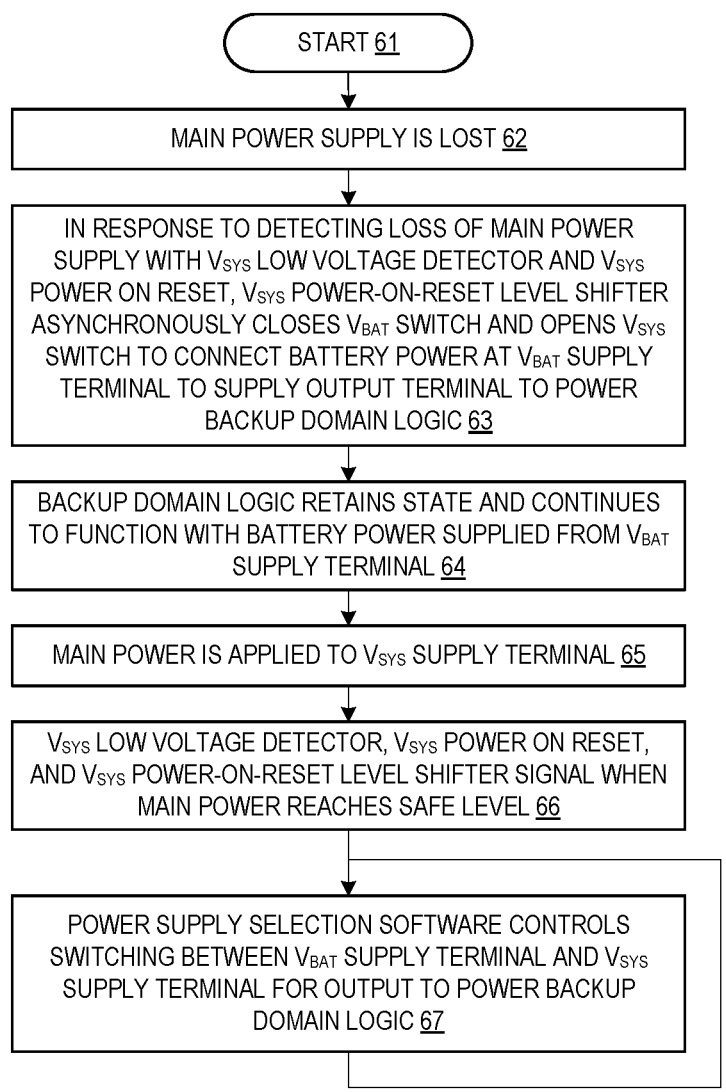
FIG. 6 illustrates a simplified flow chart showing the control logic for the operation of an adaptive, software-controlled power supply multiplexer when the main power supply is temporarily lost or powered down in accordance with selected embodiments of the present disclosure.

To address a fourth power supply sequencing scenario, reference is now made to FIG. 6 which illustrates a simplified flow chart 60 showing the control logic and methodology for operating an adaptive, software-controlled power supply multiplexer when the main power supply is temporarily lost or powered down in accordance with selected embodiments of the present disclosure. When the method starts (step 61), the main power that applied to the $V_{SYS}$ battery power terminal is connected by the $V_{SYS}$ switch to power the backup power domain. In addition, the selection control circuit is fully powered so that the power supply multiplexer can detect when the main power supply $V_{SYS}$ is at a safe level. Upon the loss or disruption of the main power supply (step 62), the $V_{SYS}$ low voltage detector (e.g., 105), $V_{SYS}$ POR (e.g., POR 106), and $V_{SYS}$ POR level shifter (e.g., PORLS 109) generate a missing supply switching signal to asynchronous close the $V_{BAT}$ switch (e.g., S1) AND open the $V_{SYS}$ switch (e.g., S2) to connect the output terminal $V_{BATSW}$ to the battery power supply $V_{BAT}$ at the $V_{BAT}$ supply terminal (step 63). By rapidly switching the power supplies, the backup domain logic retains its state and continues to function (step 64). At step 65, the main power supply $V_{SYS}$ is restored or (re)applied to the $V_{SYS}$ supply terminal, and once the selection control circuit is fully powered, the power supply multiplexer can detect when the main power supply $V_{SYS}$ is at a safe level. To this end, the low voltage detector (e.g., LVD 105), $V_{SYS}$ POR (e.g., POR 106), and $V_{SYS}$ POR level shifter (e.g., PORLS 109) generate a signal when the main power applied to the $V_{SYS}$ supply terminal is at a safe level (step 66). At this point, both the main power supply $V_{SYS}$ and the battery power supply $V_{BAT}$ are available to power the backup logic domain, and the power supply selection software can then control the switching between the battery power supply (at the $V_{BAT}$ supply terminal) and main power supply (at the $V_{SYS}$ supply terminal) for output to power the backup domain logic (step 67). For example, the power supply selection software may respond to a user configuration bit being set to a first value (e.g., 1) to connect the main power supply (at the $V_{SYS}$ supply terminal) for output to power the backup domain logic. And if the user configuration bit is set to a second value (e.g., 0), then the power supply selection software may connect the battery power supply (at the $V_{BAT}$ supply terminal) for output to power the backup domain logic.

Figure 7:
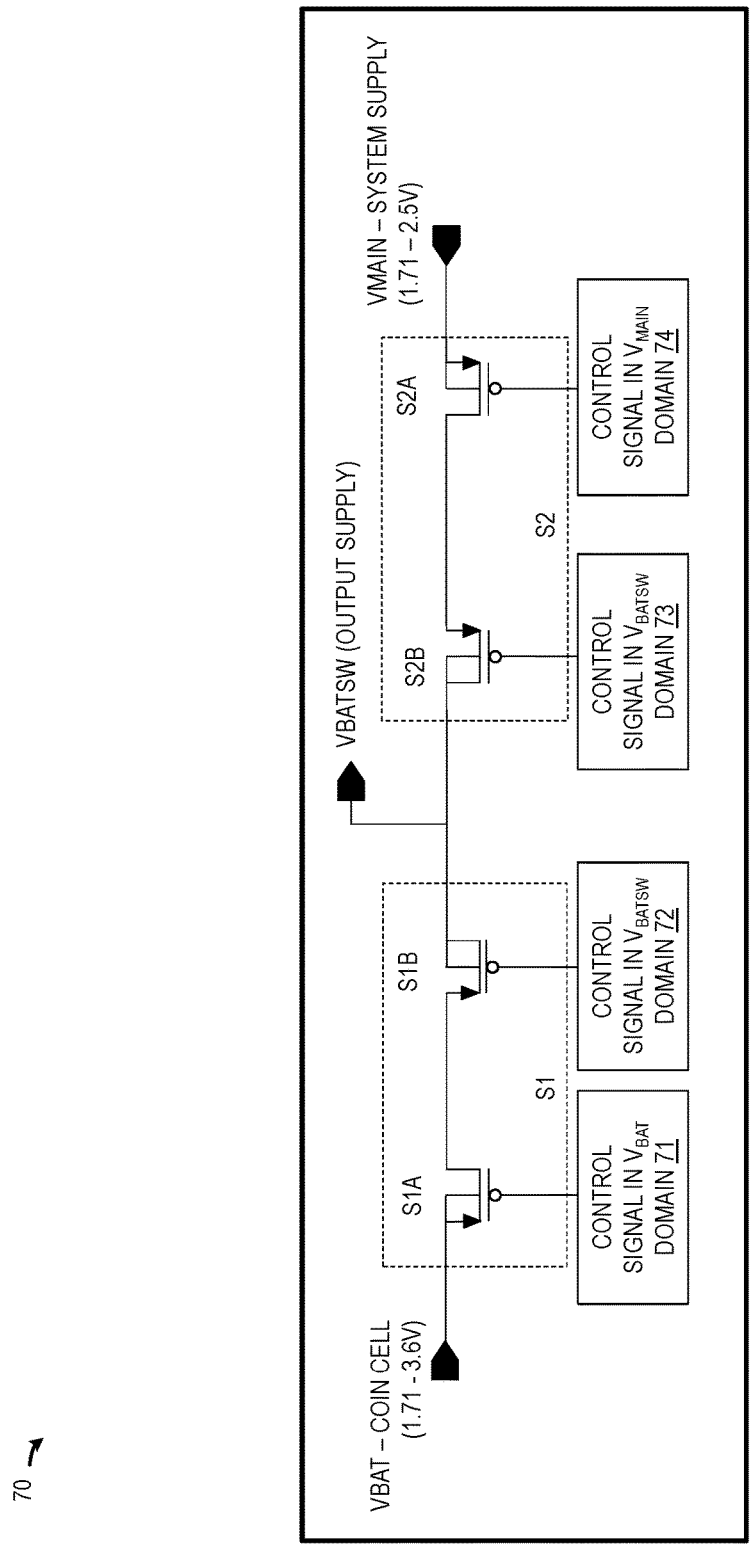
FIG. 7 illustrates a simplified schematic circuit diagram of a power stage circuit wherein first and second power switches selectively connect the output supply terminal $V_{BATSW}$ to either a first battery input voltage supply $V_{BAT}$ or a second main input voltage supply $V_{MAIN}$ in response to a plurality of control signals.

To provide additional details for an improved understanding of selected embodiments of the present disclosure, reference is now made to FIG. 7 which is a simplified schematic circuit diagram illustrating a power stage circuit 70 wherein a first power switch S1 and second power switch S2 selectively connect the output supply terminal $V_{BATSW}$ to either a first battery input voltage supply $V_{BAT}$ or a second main input voltage supply $V_{MAIN}$ in response to a plurality of control signals 71-74. As depicted, the first power switch S1 is formed with a first pair of PMOS transistors S1A, S1B which are connected in series between the first battery input voltage supply $V_{BAT}$ and the output supply terminal $V_{BATSW}$. In similar fashion, the second power switch S2 is formed with a second pair of PMOS transistors S2A, S2B which are connected in series between the second main input voltage supply $V_{MAIN}$ and the output supply terminal $V_{BATSW}$. In selected embodiments, the PMOS transistors S1A, S1B, S2A, S2B may be implemented to eliminate forward-biased diodes and channel leakage by constructing the outer PMOS transistors S1A, S2A to connect their respective bulk/well regions to the input supply terminals $V_{BAT}$, $V_{MAIN}$ and by constructing the inner PMOS transistors S1B, S2B to connect their respective bulk/well regions to the output supply terminal $V_{BATSW}$. And to selectively control the switching of the input voltage supplies $V_{BAT}$, $V_{MAIN}$, the outer PMOS transistor S1A may be connected to have its gate driven by a first control signal 71 in the $V_{BAT}$ domain, while the outer PMOS transistor S2A may be connected to have its gate driven by a second control signal 74 in the $V_{MAIN}$ domain. In addition, the inner PMOS transistor S1B may be connected to have its gate driven by a third control signal 72 in the $V_{BATSW}$ domain, while the inner PMOS transistor S2B may be connected to have its gate driven by a fourth control signal 73 in the $V_{BATSW}$ domain. In this configuration, the power stage circuit 70 provides a robust power supply implementation which allows the two input supplies $V_{BAT}$, $V_{MAIN}$ to be truly independent of one other. As described above, the gate controls are generated from the domains to fully turn OFF any PMOS device that needs to be OFF, thereby eliminating any OFF state leakage through such PMOS devices. To this end, the bulk/well connections help eliminate any forward biased bulk/well diodes and any conduction through the bulk/well of the PMOS devices and also eliminate latch-up concerns.

Figure 8:
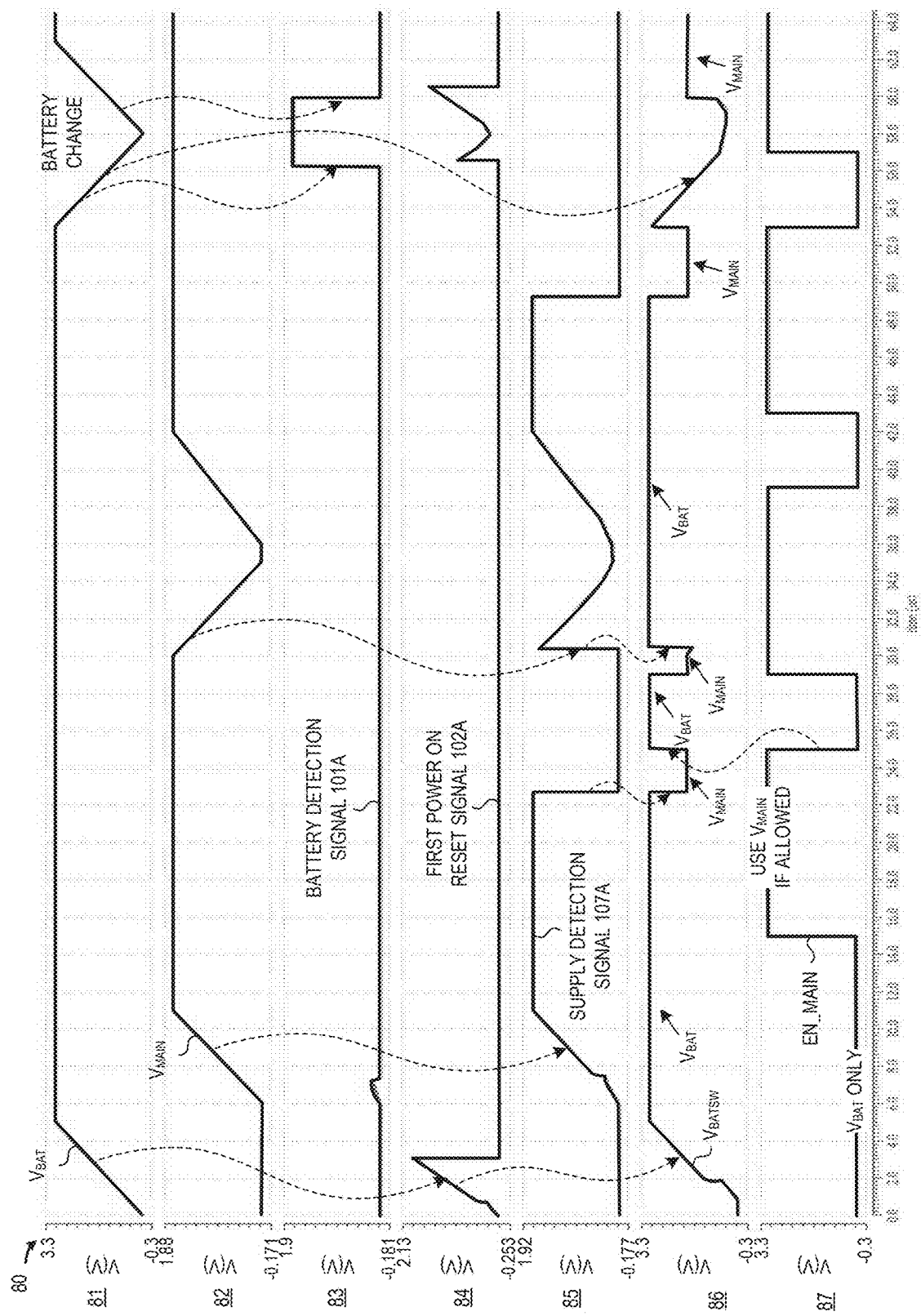
FIG. 8 is a diagrammatic illustration of simulated transient waveforms at selected nodes in the software-controlled power supply multiplexer in accordance with selected embodiments of the present disclosure.

To provide additional details for an improved understanding of selected embodiments of the present disclosure, reference is now made to FIG. 8 which is a diagrammatic illustration 80 of simulated transient waveforms 81-87 at selected nodes in the software-controlled power supply multiplexer depicted in FIG. 1. As depicted in the power supply waveforms 81, 82, the battery power $V_{BAT}$ 81 is applied first before the main power $V_{MAIN}$ 82 is applied. As the battery supply $V_{BAT}$ 81 powers up during a first timing interval (e.g., between 0 and 5 µs) when the main supply 82 is not present, the first power on reset signal 102A asserts (as shown in waveform 84) to force the first level shifter (e.g., 103) to select and switch the battery power $V_{BAT}$ for output to the output terminal $V_{BATSW}$ (as shown in waveform 86) so that the output terminal $V_{BATSW}$ follows or tracks the battery supply $V_{BAT}$.

As the main supply $V_{MAIN}$ 82 powers up during a second timing interval (e.g., between 6 and 11 µs) when the battery supply $V_{BAT}$ 81 is also present, the supply detection signal 107A asserts with the power ramp and de-asserts after a delay (e.g., at 23 us) (as shown in waveform 85), indicating that the main supply $V_{MAIN}$ 82 is valid. In response to the supply detection signal 107A, the POR level shifter (e.g., 109) de-asserts a power on reset signal (e.g., 109A) that is inverted and combined with the software-controlled main power supply enable selection signal EN_MAIN 87 (e.g., EN_MAIN="1") to select and switch the main power $V_{MAIN}$ for output to the output terminal $V_{BATSW}$ so that the output terminal $V_{BATSW}$ drops to match the main supply $V_{MAIN}$ (e.g., 1.6V) as shown in waveform 86. In this example, the software-controlled main power supply enable selection signal EN_MAIN 87 is set to "1" to indicate that the main supply $V_{MAIN}$ 82 is to be used to power the backup domain if the main supply $V_{MAIN}$ is valid and allowed.

If and when the software-controlled main power supply enable selection signal EN_MAIN 87 switches (e.g., at 25 µs) to indicate that the output terminal $V_{BATSW}$ 86 is to be switched to the battery supply $V_{BAT}$ 81, the output terminal $V_{BATSW}$ rises to match the battery supply $V_{BAT}$ 81 (e.g., 3.0V) (as shown in waveform 86).

In situations where the main power $V_{MAIN}$ has been selected by the software-controlled main power supply enable selection signal EN_MAIN 87 (e.g., EN_MAIN="1"), but the main power $V_{MAIN}$ drops to an invalid range (e.g., at ~31 μs), the supply detection signal 107A asserts (as shown in waveform 85) to drive the selection control circuit 108 to switch the output terminal $V_{BATSW}$ 86 to be powered by the battery supply $V_{BAT}$ 81, causing the output terminal $V_{BATSW}$ to rise to match the battery supply $V_{BAT}$ 81 (e.g., 3.0V) (as shown in waveform 86).

In battery switching situations where the battery power $V_{BAT}$ 81 has been selected and the battery power $V_{BAT}$ 81 drops to an invalid level (e.g., at ~54 μs), the battery detection signal 101A asserts (as shown in waveform 83) to force the first level shifter (e.g., 104) to override the selection control 108 and keep switch S2 disconnected, thereby preventing any back current from $V_{MAIN}$ to $V_{BATSW}$ or $V_{BAT}$. With the switch output $V_{BATSW}$ remaining connected to $V_{BAT}$ (as shown in waveform 86), the output terminal $V_{BATSW}$ decays or tracks the battery supply $V_{BAT}$. In this case, the asserted battery detection signal 101A overrides the software-controlled main power supply enable selection signal EN_MAIN 87 being set to "1" and the main power $V_{MAIN}$ being valid by opening or disconnecting the output terminal $V_{BATSW}$ from the main supply $V_{MAIN}$.

When battery power $V_{BAT}$ 81 is restored, the battery detection signal 101A de-asserts (as shown in waveform 83) and the selection control 108 is able to close/connect switch S2, causing the output terminal $V_{BATSW}$ to rise to match the main supply $V_{MAIN}$ 82 (e.g., 1.6V) (as shown in waveform 86).

As disclosed herein, the power supply controller method, system, and apparatus for prolonging the battery life of a low power microcontroller may be implemented with one or more main power supplies and at least one backup power supply which are selectively switched to power a backup power domain under software control by providing a selection control module that is digital controlled by control logic and/or computer program product to monitor the status of the main and backup power supplies without requiring continuous voltage level monitoring that continuously drains the battery and to enable powering of the backup power domain with the one or more main power supplies, thereby preserving battery life. Although embodiments are described in the context of monitoring the main and backup power supplies with POR circuits in order to eliminate current consumption from the battery, the proposed power supply control steps and/or functionality may be applied to save battery consumption when using any suitable current or voltage monitoring techniques since the current consumption benefits are still realized by enabling the backup power domain to be powered by the one or more main power supplies in cases where the battery power voltage is higher than the voltage level of the one or more main power supplies.

By now it should be appreciated that there is provided herein a power supply system, apparatus, and methodology for supplying power to a backup power domain under software control. In the disclosed methodology, a first supply control circuit is activated to connect a battery power supply voltage to a supply terminal for a backup power domain in a low power microcontroller during a startup mode when a main power supply voltage for the low power microcontroller is not ready so that the backup power domain is supplied by the battery power supply voltage. In selected embodiments, the first supply control circuit is activated by generating a first power-on-reset signal to close a first switch connecting the battery power supply voltage to the supply terminal for a backup power domain. In addition, a battery detection signal is generated to open a second switch connecting the main power supply voltage to the supply terminal for a backup power domain during the startup mode. In addition, the disclosed methodology includes activating a second supply control circuit to detect the main power supply voltage being applied to the low power microcontroller at a predetermined safe voltage level. In selected embodiments, the second supply control circuit is activated by generating a main supply detection signal when the main power supply voltage is at a predetermined safe level. In such embodiments, the main supply detection signal may be generated by detecting if the main power supply voltage is above a low voltage threshold value and/or by generating a second power-on-reset signal in response to the main power supply voltage being applied to the low power microcontroller. The disclosed methodology also includes activating a selection control circuit to power the backup power domain in the low power microcontroller from the main power supply voltage or the backup power supply voltage based on a software-controlled configuration bit. As disclosed, the selection control circuit is configured to connect, in response to the software-controlled configuration bit having a first user-selected value, the main power supply voltage to the supply terminal for the backup power domain when the main power supply voltage is smaller than the battery power supply voltage. In addition, the selection control circuit is configured to connect, in response to the software-controlled configuration bit having a second user-selected value, the backup power supply voltage to the supply terminal for the backup power domain. In selected the selection control circuit may be activated powering a signal gating circuit, such as a series-connected AND gate circuit and inverter circuit, with the supply terminal for the backup power domain and powering a power-on-reset level shifter circuit with the battery power supply voltage to enable the signal gating circuit (e.g., an AND gate circuit) to generate a first input signal to control the first supply control circuit by performing a logical AND combination of the software-controlled configuration bit and a power-on-reset level shifted signal generated by the power-on-reset level shifter circuit in response to the main supply detection signal, and to enable the signal gating circuit (e.g., an inverter circuit) to generate a second input signal to control the second supply control circuit by inverting the first level shift input signal.

In another form, there is provided herein a power management system, apparatus, and methodology for supplying power to a backup domain in a microcontroller unit under software control. In selected embodiments, the microcontroller unit is a low power microcontroller unit implementing an Internet-of-Things (IoT) application. The disclosed power management system includes an output supply terminal for the battery domain, an input battery power supply terminal, and an input main power supply terminal. In selected embodiments, the input battery power supply terminal is configured for connection to a coin-cell battery. The disclosed power management system also includes a first supply control circuit connected between the input battery power supply terminal and the output supply terminal. In selected embodiments, the first supply control circuit includes a first switch (that is connected between the input battery power supply terminal and the output supply terminal and that is opened or closed in response to a first gating control signal), a battery detector (that is connected to detect a battery power supply voltage applied to the input battery power supply terminal), a first power on reset circuit (that is connected to generate a first power on reset signal in response to a battery power supply voltage being applied to the input battery power supply terminal), and a first isolated level shifter (that is connected to receive a first level shift input signal and configured to generate the first gating control signal to close the first switch when the first power on reset signal indicates there is no valid battery power supply voltage applied to the input battery power supply terminal, and to generate the first gating control signal to enable the first switch to be controlled by the selection control circuit when the first power on reset signal indicates there is a valid battery power supply voltage applied to the input battery power supply terminal). In addition, the disclosed power management system includes a second supply control circuit connected between the input main power supply terminal and the output supply terminal. In selected embodiments, the second supply control circuit includes a second switch (that is connected between the input main power supply terminal and the output supply terminal and that is opened or closed in response to a second gating control signal), a low voltage detector (that is connected to generate a low voltage detection signal when the main power supply voltage applied to the input main power supply terminal is below a low voltage threshold), a second power on reset circuit (that is connected to generate a second power on reset signal in response to the main power supply voltage being applied to the input main power supply terminal), a first gating circuit, such as a logical OR gate circuit (that is connected to generate a supply detection signal in response to the low voltage detection signal and the second power on reset signal, where the supply detection signal has a first logic value to indicate that the main power supply voltage applied to the input main power supply terminal is at a safe level and has a second logic value to indicate that the main power supply voltage applied to the input main power supply terminal is not at a safe level), and a second isolated level shifter (that is connected to receive a second level shift input signal and configured to generate the second gating control signal to open the second switch when the battery detector indicates there is no battery power supply voltage applied to the input battery power supply terminal, and to generate the second gating control signal to enable the second switch to be controlled by the selection control circuit when the supply detection signal indicates there is a valid main power supply voltage applied to the input main power supply terminal). The disclosed power management system also includes a selection control circuit connected to the first and second supply control circuits. As disclosed, the selection control circuit is configured to activate the first supply control circuit to connect the output supply terminal to a battery power supply voltage applied to the input battery power supply terminal during a startup mode when there is not a main power supply voltage ready at the input main power supply terminal so that the battery domain is supplied by the battery power supply voltage. The disclosed selection control circuit is also configured to activate the second supply control circuit to detect there is a main power supply voltage at a predetermined safe voltage level at the input main power supply terminal. In addition, the disclosed selection control circuit is configured to activate the first and second supply control circuits to power the battery domain by switching the output supply terminal to either the main power supply voltage or the backup power supply voltage based on a software-controlled configuration bit. In selected embodiments, the selection control circuit is also configured to connect, in response to the software-controlled configuration bit having a first user-selected value, the main power supply voltage to the output supply terminal when the main power supply voltage is smaller than the battery power supply voltage. In other embodiments, the selection control circuit is configured to connect, in response to the software-controlled configuration bit having a second user-selected value, the backup power supply voltage to the output supply terminal. In other embodiments, the selection control circuit includes a power on reset level shifter circuit (that is connected to monitor the battery power supply voltage and main power supply voltage when supplied by the battery power supply voltage from the input battery power supply terminal to generate a third power on reset signal in response to the supply detection signal), a second gating circuit, such as a logical AND gate circuit (that is connected to receive the software-controlled configuration bit and an inverted version of the third power on reset signal and configured to generate the first level shift input signal to the first isolated level shifter when supplied by an output voltage from the output supply terminal), and a logical inverter circuit (that is connected to receive the first level shift input signal and configured to generate the second level shift input signal to the second isolated level shifter when supplied by the output voltage from the output supply terminal). In selected embodiments, the selection control circuit enables the first and second supply control circuits to power the battery domain from the main power supply voltage applied to the input main power supply terminal when the main power supply voltage is smaller than the battery power supply voltage applied to the input battery power supply terminal and is also larger than a predetermined minimum voltage threshold.

In yet another form, there is provided a computer-implemented method for managing a backup power domain power supply in a low power microcontroller unit (MCU) system, such as a low power microcontroller unit implementing an Internet-of-Things (IoT) application. In the disclosed methodology, a software-controlled power supply multiplexer receives status information of a battery power supply and a main power supply of the MCU system. In selected embodiments, the battery power supply is provided by a coin-cell battery. In the event that the battery power supply is applied before the main power supply is applied and is ready to supply power to the backup power domain, the software-controlled power supply multiplexer generates a first power on reset switching signal to connect the battery power supply to an output supply terminal for the backup power domain while disconnecting the main power supply from the output supply terminal during a startup mode when the main power supply is not ready to supply power to the backup power domain. In the event that the battery power supply is disconnected while the main power supply is applied and ready to supply power to the backup power domain, the software-controlled power supply multiplexer generates a battery missing switching signal to disconnect the main power supply from the output supply terminal for the backup power domain while the battery power supply is disconnected. In the event that the main power supply is lost while the battery power supply is applied and ready to supply power to the backup power domain, the software-controlled power supply multiplexer generates a missing supply switching signal to asynchronously connect the battery power supply to the output supply terminal for the backup power domain while the main power supply is lost. In the event that both the main power supply and the battery power supply are ready to supply power to the backup power domain, the software-controlled power supply multiplexer generates one or more switching signals to power the backup power domain with either the main power supply or the backup power supply based on a software-controlled configuration bit. In particular, the one or more switching signals are generated to connect, in response to the software-controlled configuration bit having a first user-selected value, the main power supply to the output supply terminal for the backup power domain when the main power supply is smaller than the battery power supply. In addition, the one or more switching signals are generated to connect, in response to the software-controlled configuration bit having a second user-selected value, the battery power supply to the output supply terminal for the backup power domain when the backup power supply. In selected embodiments, the software-controlled power supply multiplexer generates the one or more switching signals to connect, in response to the software-controlled configuration bit having a first user-selected value, the main power supply to the output supply terminal for the backup power domain when the main power supply is smaller than the battery power supply and is also larger than a predetermined minimum voltage threshold.

Various illustrative embodiments of the present invention have been described in detail with reference to the accompanying figures to illustrate exemplary embodiments in terms of an adaptive power supply architecture system, device, and associated method of operation, but the present disclosure is not necessarily limited to the example embodiments which illustrate inventive aspects of the present invention that are applicable to a wide variety of power controllers. Thus, while various details are set forth in the foregoing description, it will be appreciated that the present invention may be practiced without these specific details, and that numerous implementation-specific decisions may be made to the invention described herein to achieve the circuit designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram form, rather than in detail, in order to avoid limiting or obscuring the present invention. Although the described exemplary embodiments disclosed herein are directed to an exemplary power system architecture wherein the generated signals are described with reference to example logic levels, the present disclosure is not necessarily limited to the example embodiments illustrate herein, and various embodiments of the circuitry and methods disclosed herein may be implemented with other devices and software components. Thus, the particular embodiments disclosed above are illustrative only and should not be taken as limitations upon the present invention, as the invention may be modified and practiced in different but equivalent manners apparent to those skilled in the art having the benefit of the teachings herein. Accordingly, the foregoing description is not intended to limit the invention to the particular form set forth, but on the contrary, is intended to cover such alternatives, modifications and equivalents as may be included within the spirit and scope of the invention as defined by the appended claims so that those skilled in the art should understand that they can make various changes, substitutions and alterations without departing from the spirit and scope of the invention in its broadest form.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for supplying power to a backup power domain under software control, comprising:

activating a first supply control circuit to connect a battery power supply voltage to a supply terminal for a backup power domain in a microcontroller during a startup mode when a main power supply voltage for the microcontroller is not ready so that the backup power domain is supplied by the battery power supply voltage;

activating a second supply control circuit to detect the main power supply voltage being applied to the microcontroller at a predetermined safe voltage level; and activating a selection control circuit to power the backup power domain in the microcontroller from the main power supply voltage or the battery power supply voltage based on a software-controlled configuration bit, where the selection control circuit is configured to connect, in response to the software-controlled configuration bit having a first user-selected value, the main power supply voltage to the supply terminal for the backup power domain when the main power supply voltage is smaller than the battery power supply voltage, and where the selection control circuit is configured to connect, in response to the software-controlled configuration bit having a second user-selected value, the battery power supply voltage to the supply terminal for the backup power domain.

2. The method of claim 1, where activating the first supply control circuit comprises generating a first power-on-reset signal to close a first switch connecting the battery power supply voltage to the supply terminal for the backup power domain.

3. The method of claim 2, further comprising generating a battery detection signal to open a second switch connecting the main power supply voltage to the supply terminal for the backup power domain during the startup mode.

4. The method of claim 1, where activating the second supply control circuit comprises generating a main supply detection signal when the main power supply voltage is at a predetermined safe level.

5. The method of claim 4, where generating the main supply detection signal comprises detecting if the main power supply voltage is above a low voltage threshold value.

6. The method of claim 4, where generating the main supply detection signal comprises generating a second power-on-reset signal in response to the main power supply voltage being applied to the microcontroller.

7. The method of claim 4, where activating the selection control circuit comprises powering a signal gating circuit with the supply terminal for the backup power domain and powering a power-on-reset level shifter circuit with the battery power supply voltage to enable the signal gating circuit to generate a first input signal to control the first supply control circuit by performing a logical AND combination of the software-controlled configuration bit and a power-on-reset level shifted signal generated by the power-on-reset level shifter circuit in response to the main supply detection signal, and to enable the signal gating circuit to generate a second input signal to control the second supply control circuit by inverting the first level shift input signal.

8. A power management system for a microcontroller unit having a battery domain, comprising:
an output supply terminal for the battery domain;
an input battery power supply terminal;
an input main power supply terminal;
a first supply control circuit connected between the input battery power supply terminal and the output supply terminal;
a second supply control circuit connected between the input main power supply terminal and the output supply terminal; and
a selection control circuit connected to the first and second supply control circuits and configured to:
activate the first supply control circuit to connect the output supply terminal to a battery power supply voltage applied to the input battery power supply terminal during a startup mode when there is not a main power supply voltage ready at the input main power supply terminal so that the battery domain is supplied by the battery power supply voltage;
activate the second supply control circuit to detect there is a main power supply voltage at a predetermined safe voltage level at the input main power supply terminal; and
activate the first and second supply control circuits to power the battery domain by switching the output supply terminal to either the main power supply voltage or the backup power supply voltage based on a software-controlled configuration bit.

9. The power management system of claim 8, where the selection control circuit is configured to connect, in response to the software-controlled configuration bit having a first user-selected value, the main power supply voltage to the output supply terminal when the main power supply voltage is smaller than the battery power supply voltage.

10. The power management system of claim 8, where the selection control circuit is configured to connect, in response to the software-controlled configuration bit having a second user-selected value, the backup power supply voltage to the output supply terminal.

11. The power management system of claim 8, where the first supply control circuit comprises:
a first switch connected between the input battery power supply terminal and the output supply terminal, where the first switch is opened or closed in response to a first gating control signal;
a battery detector connected to detect a battery power supply voltage applied to the input battery power supply terminal;
a first power on reset circuit connected to generate a first power on reset signal in response to the battery power supply voltage being applied to the input battery power supply terminal; and
a first isolated level shifter connected to receive a first level shift input signal and configured to generate the first gating control signal to close the first switch when the first power on reset signal indicates there is no valid battery power supply voltage applied to the input battery power supply terminal, and to generate the first gating control signal to enable the first switch to be controlled by the selection control circuit when the first power on reset signal indicates there is a valid battery power supply voltage applied to the input battery power supply terminal.

12. The power management system of claim 11, where the second supply control circuit comprises:
a second switch connected between the input main power supply terminal and the output supply terminal, where the second switch is opened or closed in response to a second gating control signal;
a low voltage detector connected to generate a low voltage detection signal when the main power supply voltage applied to the input main power supply terminal is below a low voltage threshold;
a second power on reset circuit connected to generate a second power on reset signal in response to the main power supply voltage being applied to the input main power supply terminal;
a first gating circuit connected to generate a supply detection signal in response to the low voltage detection signal and the second power on reset signal, where the supply detection signal has a first logic value to indicate that the main power supply voltage applied to the input main power supply terminal is at a safe level and has a second logic value to indicate that the main power supply voltage applied to the input main power supply terminal is not at a safe level; and
a second isolated level shifter connected to receive a second level shift input signal and configured to generate the second gating control signal to open the second switch when the battery detector indicates there is no battery power supply voltage applied to the input battery power supply terminal, and to generate the second gating control signal to enable the second switch to be controlled by the selection control circuit when the supply detection signal indicates there is a valid main power supply voltage applied to the input main power supply terminal.

13. The power management system of claim 12, where the selection control circuit comprises:
a power on reset level shifter circuit connected to monitor the battery power supply voltage and main power supply voltage when supplied by the battery power supply voltage from the input battery power supply terminal to generate a third power on reset signal in response to the supply detection signal;
a second gating circuit connected to receive the software-controlled configuration bit and an inverted version of the third power on reset signal and configured to generate the first level shift input signal to the first isolated level shifter when supplied by an output voltage from the output supply terminal; and
a logical inverter circuit connected to receive the first level shift input signal and configured to generate the second level shift input signal to the second isolated level shifter when supplied by the output voltage from the output supply terminal.

14. The power management system of claim 8, where the microcontroller unit is a low power microcontroller unit implementing an Internet-of-Things (IoT) application.

15. The power management system of claim 8, where the selection control circuit enables the first and second supply control circuits to power the battery domain from the main power supply voltage applied to the input main power supply terminal when the main power supply voltage is smaller than the battery power supply voltage applied to the input battery power supply terminal and is also larger than a predetermined minimum voltage threshold.

16. A computer-implemented method for managing a backup power domain power supply in a microcontroller unit (MCU) system, comprising:
   receiving, at a software-controlled power supply multiplexer, status information of a battery power supply and a main power supply of the MCU system;
   in an event that both the main power supply and the battery power supply are ready to supply power to the backup power domain, generating, by the software-controlled power supply multiplexer, one or more switching signals to power the backup power domain with either the main power supply or the backup power supply based on a software-controlled configuration bit,
   where the one or more switching signals connect, in response to the software-controlled configuration bit having a first user-selected value, the main power supply to the output supply terminal for the backup power domain when the main power supply is smaller than the battery power supply, and
   where the one or more switching signals connect, in response to the software-controlled configuration bit having a second user-selected value, the battery power supply to the output supply terminal for the backup power domain.

17. The computer-implemented method of claim 16, further comprising, in an event that the battery power supply is applied before the main power supply is applied and is ready to supply power to the backup power domain, generating, by the software-controlled power supply multiplexer, a first power on reset switching signal to connect the battery power supply to an output supply terminal for the backup power domain while disconnecting the main power supply from the output supply terminal during a startup mode when the main power supply is not ready to supply power to the backup power domain.

18. The computer-implemented method of claim 16, further comprising:
   in an event that the battery power supply is disconnected while the main power supply is applied and ready to supply power to the backup power domain, generating, by the software-controlled power supply multiplexer, a battery missing switching signal to disconnect the main power supply from the output supply terminal for the backup power domain while the battery power supply is disconnected.

19. The computer-implemented method of claim 16, further comprising, in an event that the main power supply is lost while the battery power supply is applied and ready to supply power to the backup power domain, generating, by the software-controlled power supply multiplexer, a missing supply switching signal to asynchronously connect the battery power supply to the output supply terminal for the backup power domain while the main power supply is lost.

20. The computer-implemented method of claim 16, where the software-controlled power supply multiplexer generates the one or more switching signals to connect, in response to the software-controlled configuration bit having a first user-selected value, the main power supply to the output supply terminal for the backup power domain when the main power supply is smaller than the battery power supply and is also larger than a predetermined minimum voltage threshold.

* * * * *